SOLID STATE SCANNING SYSTEM

Filed Dec. 5, 1966 4 Sheets-Sheet 1

INVENTORS:
DANIEL C. OSBORN,
RICHARD D. STEWART,
BY Marvin Goldenberg
THEIR ATTORNEY.

SOLID STATE SCANNING SYSTEM

Filed Dec. 5, 1966 4 Sheets-Sheet 2

FIG. 3

| SCAN | 1st LINE | | | | | H.B. | 2nd LINE | | | | | H.B. | 3rd LINE | | | | | H.B. | 4th LINE | | | | | H.B. | 5th LINE | | | | | H.B. |
|---|---|---|---|---|---|---|---|---|---|---|---|---|---|---|---|---|---|---|---|---|---|---|---|---|---|---|---|---|---|---|
| TIME PERIODS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| DELAY LINE A | 1 | 2 | 3 | 4 | 5 | 1 | 2 | 3 | 4 | 5 | 1 | 2 | 3 | 4 | 5 | 1 | 2 | 3 | 4 | 5 | 1 | 2 | 3 | 4 | 5 | 1 | 2 | 3 | 4 | 5 |
| DELAY LINE B | 1 | 2 | 3 | 4 | 5 | 6 | 1 | 2 | 3 | 4 | 5 | 6 | 1 | 2 | 3 | 4 | 5 | 6 | 1 | 2 | 3 | 4 | 5 | 6 | 1 | 2 | 3 | 4 | 5 | 6 |

FIG. 7

| SCAN | 1st LINE | | | | | H.B. | 2nd LINE | | | | | H.B. | 3rd LINE | | | | | H.B. | 4th LINE | | | | | H.B. | 5th LINE | | | | | H.B. | V.B. | V.B. | V.B. | V.B. | V.B. |
|---|---|---|---|---|---|---|---|---|---|---|---|---|---|---|---|---|---|---|---|---|---|---|---|---|---|---|---|---|---|---|---|---|---|---|---|
| TIME PERIODS | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
| DELAY LINE C | 1 | 2 | 3 | 4 | 5 | 1 | 2 | 3 | 4 | 5 | 1 | 2 | 3 | 4 | 5 | 1 | 2 | 3 | 4 | 5 | 1 | 2 | 3 | 4 | 5 | 1 | 2 | 3 | 4 | 5 | 1 | 2 | 3 | 4 | 5 |
| DELAY LINE D | 1 | 2 | 3 | 4 | 5 | 6 | 7 | 1 | 2 | 3 | 4 | 5 | 6 | 7 | 1 | 2 | 3 | 4 | 5 | 6 | 7 | 1 | 2 | 3 | 4 | 5 | 6 | 7 | 1 | 2 | 3 | 4 | 5 | 6 | 7 |

INVENTORS:
DANIEL C. OSBORN,
RICHARD D. STEWART,
BY
THEIR ATTORNEY.

INVENTORS:
DANIEL C. OSBORN,
RICHARD D. STEWART,
BY [signature]
THEIR ATTORNEY.

March 24, 1970 D. C. OSBORN ET AL 3,502,802

SOLID STATE SCANNING SYSTEM

Filed Dec. 5, 1966 4 Sheets-Sheet 4

INVENTORS:
DANIEL C. OSBORN,
RICHARD D. STEWART,

BY Marvin L. Goldenberg
THEIR ATTORNEY.

United States Patent Office 3,502,802
Patented Mar. 24, 1970

3,502,802
SOLID STATE SCANNING SYSTEM

Daniel C. Osborn, North Syracuse, and Richard D. Stewart, Camillus, N.Y., assignors to General Electric Company, a corporation of New York Filed Dec. 5, 1966, Ser. No. 599,267
Int. Cl. H04n 3/14
U.S. Cl. 178—6 14 Claims

ABSTRACT OF THE DISCLOSURE

Scanning apparatus for providing a sequential line scan of a solid state matrix of passive or active elements. The apparatus comprises first and second delay means generating multiple outputs at successive points in time which outputs are connected to said matrix, said delay means each having a feedback connection which retrigger said delay means at times which are continuously varying with respect to one another.

The invention relates to solid state scanning systems for scanning a matrix of either passive or active elements and, in particular, to novel scanning circuitry employing delay means for providing a sequential line scan of a solid state matrix. The invention described herein was made in the performance of work under a NASA contract and is subject to the provisions of Section 305 of the National Aeronautics and Space Act of 1958, Public Law 85,568 (72 Stat. 435; 42 U.S.C. 2457).

In recent years there has been considerable development in solid state matrices of photosensitive and light emissive elements for application to advanced image sensing and display devices. In devices of this type scanning is performed by direct electrical connections to the matrix. Obvious advantage may be provided over present day television camera and receiver equipment. Notably, electron beam components are not required so that these new devices can be made to be compact, rugged, low powered and potentially inexpensive. Until the present, electronic circuitry, including several active elements for each matrix connection, has been employed for performing the scanning function. For matrices having numerous elements the required scanning circuitry can become exceedingly complex.

It is accordingly an object of the present invention to provide a novel solid state scanning system for scanning a solid state matrix in either an image sensing or image display application, which apparatus is of a relatively simple and inexpensive construction.

It is still another object of the invention to provide a scanning system as above described which is rugged, reliable, of compact construction and of low power requirements.

It is a further object of the invention to provide a scanning system as above described which provides a line scan comparable to that employed in television operation.

It is another object of the invention to provide a novel solid state scanning system for scanning a matrix which does not require an electron beam forming apparatus.

It is another object of the invention to provide a novel solid state scanning system for scanning a matrix which apparatus employs a pair of multitapped delay lines, or the like, having substantially equal delay characteristics.

These and other objects of the invention are accomplished by means of a scanning system employing first and second multitapped delay means of substantially equal delay characteristics for generating electrically isolated outputs at successive points in time. The taps of said first and second delay means are electrically connected, respectively, to a first and second plurality of conductors of the matrix to be scanned. Energy is propagated along said delay means so as to appear at the taps thereof at successive points in time and thereby sequentially energize matrix components connected across intersecting conductors. The delay means are operated with a continuously varying phase so as to provide a sequential line scan of said matrix components. The continuously varying phase operation is accomplished by a feedback connection for each delay means serving to retrigger the delay means at times which are continuously varying with respect to one another, the feedback connections being taken at different lengths of each delay means.

In accordance with a first specific embodiment of the invention, a first set of matrix conductors are arranged as column conductors and a second set are arranged as diagonal conductors. The feedback connections from each of the delay means are different from each other by at least one unit delay length, where a unit delay length corresponds to the delay between adjacent taps.

In accordance with a second specific embodiment of the invention, a first set of matrix conductors are arranged as first diagonal conductors and a second set of matrix conductors are arranged as second diagonal conductors extending across said first diagonal conductors. The feedback connections from each of the delay means are different from each other by multiples of two units delay length.

In accordance with a further aspect of the invention, selected taps of the delay means are coupled to a coincidence network for supplying a synchronous trigger input to both delay lines to initiate a frame sequence in response to said taps being energized in coincidence, so as to compensate for slight delay mismatch.

The specification concludes with claims particularly pointing out and distinctly claiming the subject matter which is regarded as the invention. It is believed, however, that both as to its organization and method of operation, together with further objects and advantages thereof, the invention may be best understood from the following description taken in connection with the accompanying drawings in which:

FIGURE 3 is a table referred to in a description of the operation of FIGURE 1;

FIGURE 7 is a table referred to in a description of the operation of FIGURE 5.

Figure 1:
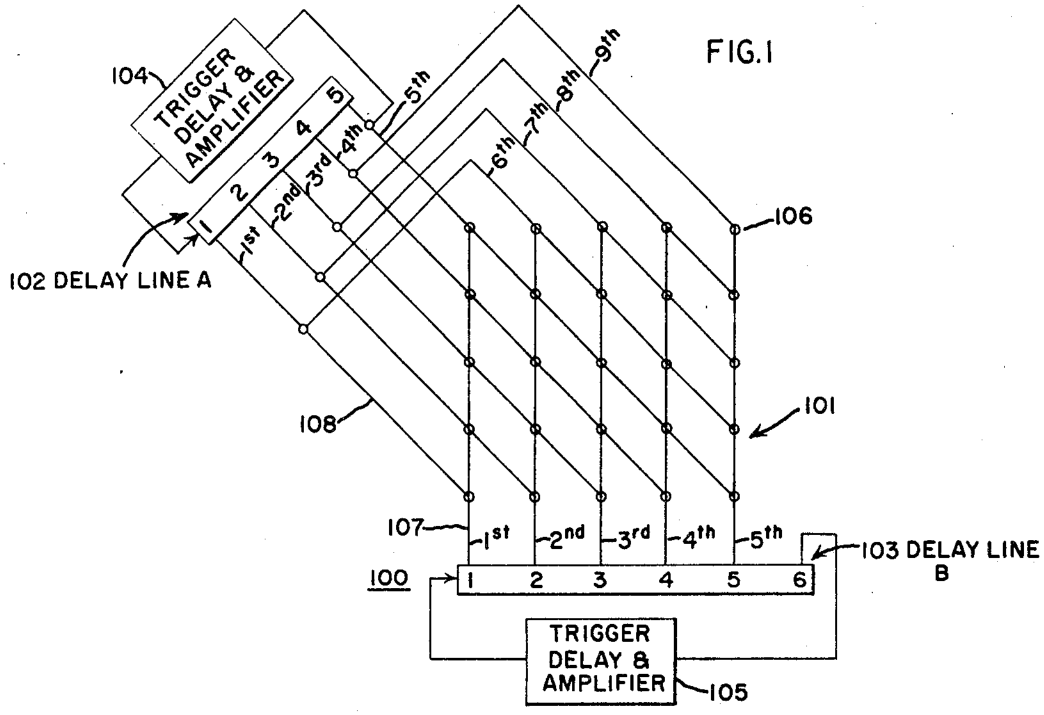
FIGURE 1 is a schematic diagram of a first embodiment in accordance with the invention of a delay line scanning system for scanning a solid state matrix.

With reference to FIGURE 1, there is schematically illustrated a first embodiment of a solid state delay line scanning system 100 for scanning a solid state matrix 101 so as to provide a line scan comparable to that employed in a television operation. The scanning structure includes a first multitapped delay line 102, illustrated as delay line A, and a second multitapped delay line 103, illustrated as delay line B. Energy is propagated along the delay lines so as to appear at the output taps thereof at successive points in time. Delay lines 102 and 103 each have equally spaced output taps and provide substantially equal unit delay lengths, where a unit delay length corresponds to the delay between adjacent taps. The end taps of delay lines A and B are fed back through trigger delay and amplifier networks 104 and 105, respectively, to successively re-trigger the lines. As will be seen, by employing delay line lengths differing by at least one unit length a line scan of the matrix 101 is provided.

Figure 2:
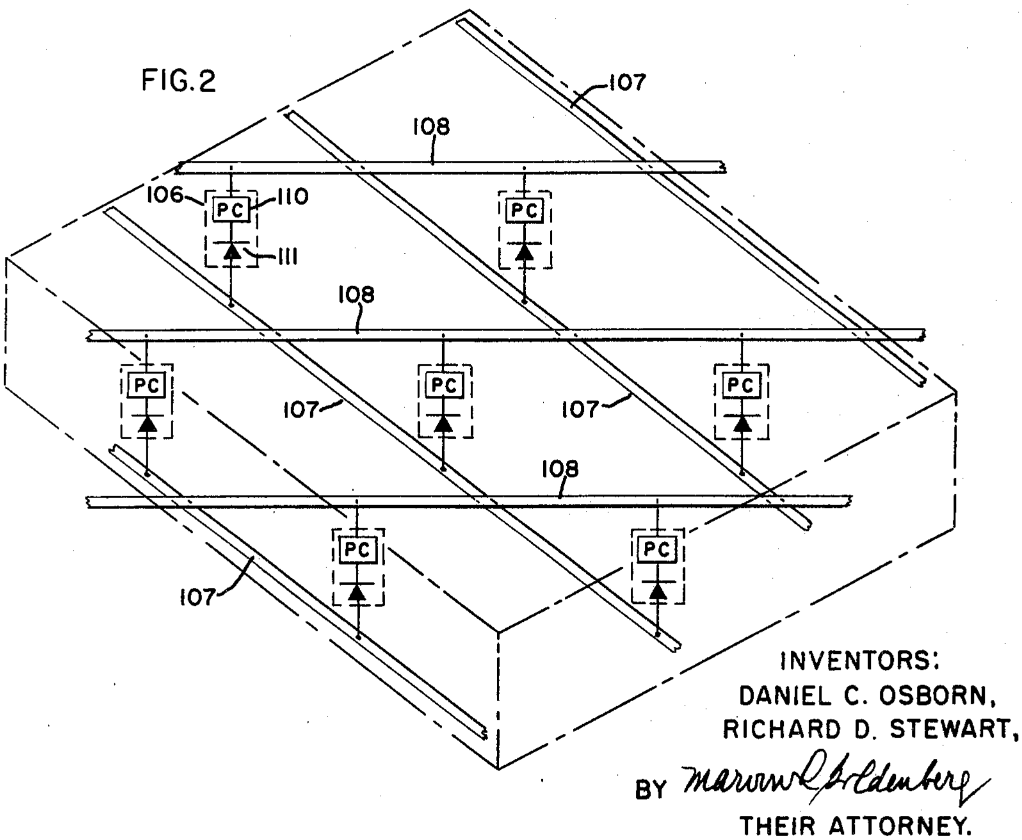
FIGURE 2 is a schematic perspective view of a portion of a photoconductor matrix such as may be employed in the system of FIGURE 1.

The matrix 101 includes an array of matrix components 106 arranged in a column and row configuration of *m* columns and *n* rows, which components in an image sensing embodiment may be nonlinear photosensitive means. For a scanning operation along rows of the matrix components 106, the components are connected at one terminal thereof to column conductors 107 individually connected to the output taps of delay line B, and at the other terminal thereof to diagonal conductors 108 connected to the output taps of delay line A, which conductors cross column conductors 107. The components 106 are seen to be connected at each intersection of the conductors 107 and 108. In the schematic perspective view of FIGURE 2, which illustrates one exemplary matrix construction, the connection of the photosensitive means to the diagonal conductors is more clearly shown. It is seen that the photosensitive means 106 each include a photoconductor element 110 in series with a diode element 111. A second matrix configuration that may suitably be employed with the invention is disclosed in a copending application for U.S. Letters Patent, entitled "Solid State Image Converter System," Ser. No. 599,126, filed Dec. 5, 1966 by R. E. Glusick, D. C. Osborn and R. D. Stewart and assigned to the assignee of the present invention.

Referring again to FIGURE 1 a 5 x 5 matrix of components is illustrated. It will be subsequently shown that the present invention is most efficiently operated with a square matrix, although it does also have application to rectangular matrices as well as other less regular matrix configurations. In addition, although only a limited number of matrix components are illustrated in order to simplify the drawing and description of the invention, for many applications the matrix may include from on the order of several hundred to many thousand components. For a 5 x 5 matrix, delay line A is provided with five output taps, with the last tap fed back to retrigger the line, thereby resulting in a total delay line length of five units. Tap 1 of delay line A is connected to the first and sixth diagonal conductors 108; tap 2 is connected to the second and seventh diagonal conductors; tap 3 is connected to the third and eighth diagonal conductors; tap 4 is connected to the fourth and ninth diagonal conductors; and tap 5 is connected to the fifth diagonal conductor. Delay line B is provided with six output taps, with the last tap feed back to retrigger the line, so as to result in a total delay line length of six units. Tap 1 of delay line B is connected to the first column conductor 106; tap 2 is connected to the second column conductor; tap 3 is connected to the third column conductor; tap 4 is connected to the fourth column conductor; tap 5 is connected to the fifth column conductor; and tap 6 is connected only to feedback network 105.

The operation of the scanning system of FIGURE 1 will be explained with reference to the table of FIGURE 3. To initiate a frame scan, trigger pulses are simultaneously applied to the inputs of delay lines A and B. Energy propagates down the lines to produce coincident outputs of corresponding taps during the first five time periods so as to scan the components 106 in the first or lowermost row. In the sixth time period output taps 1 and 6, respectively, of delay lines A and B are energized to provide a horizontal blanking interval. During time periods seven through eleven, taps 2, 3, 4, 5 and 1 of delay line A are energized in synchronism with taps 1, 2, 3, 4 and 5 of delay line B, respectively, so as to scan the second row. In the twelfth time period a second horizontal blanking interval occurs. In this manner as delay lines A and B are successively re-triggered, each of the rows of the matrix are sequentially scanned and the process repeated.

In constructing a scanning system of the type exemplified in FIGURE 1, the following principles apply:

(1) The number of diagonal conductors to be connected to delay line A are equal to one less than the sum of the rows and columns of the matrix. The number of column conductors to be connected to delay line B are equal to the number of columns.

(2) The length of delay lines A and B differ by at least one unit length, the shorter line being at least equal to the number of columns.

(3) Delay line B can have no more than two diagonal conductors connected to a single output tap, in order to avoid addressing more than a single matrix component at one time.

(4) When scanning a rectangular matrix or irregularly shaped matrix, the capacity for scan of delay lines A and B must be at least equal to that for scanning the smallest square matrix into which the scanned matrix can be fitted. For example, to scan a matrix of nine rows and twelve columns requires a delay line capacity for scanning a 12 x 12 matrix or delay lines having lengths at least 12 and 13 units, respectively.

(5) The product of the total delay line output taps of lines A and B is equal to the number of matrix components scanned plus the horizontal and vertical blanking intervals, and therefore equal to the total number of time periods in a single frame scan.

When scanning successive rows of a matrix of square configuration, a single horizontal blanking interval per line is provided, with zero vertical blanking intervals, by making the length of delay line B one unit longer than the number of columns and the length of delay line A one less than that of delay line B. Further, the vertical direction of the scan proceeds from the lowermost line to the uppermost line. By inverting the delay line lengths and making delay line A one unit longer than the number of columns, with appropriate connections to the diagonal conductors made, the vertical direction of the scan will reverse. In this case there is provided five vertical blanking intervals, with zero horizontal blanking intervals. Alternatively, interlacing scan is provided if the delay lines A and B are constructed to differ by two or more unit lengths, there also being an increase in the number of blanking intervals. Accordingly, a difference of two unit lengths produces a scan of two fields per frame, a difference of three unit lengths three fields per frame, etc. By further increasing the lengths of the delay lines, but always maintaining at least one unit length differential, additional horizontal and vertical blanking intervals can be provided as desired. It may be appreciated that a further alternative configuration of the system of FIGURE 1 is provided by the mirror image of the illustrated structure.

It is noted that the delay line lengths referred to above correspond to the delays which are provided by the delay lines between recirculating pulses, and may be termed the primary delay line lengths. As illustrated in FIGURE 1, the primary delay lengths are equal to the physical length of the lines, which is considered to present the most efficient delay line construction. However, this need not be so, particularly with respect to delay line A. Thus, the physical length of delay line A may be longer than shown, or longer than the primary delay line length, with additional output taps provided and each additional tap singly connected to the diagonal conductors. For such construction the fifth output tap is still fed back to retrigger the line. For example, delay line A can be constructed to have a primary delay line length of five units but a physical length of nine units, with each output tap singly connected to the diagonal conductors.

Figure 4:
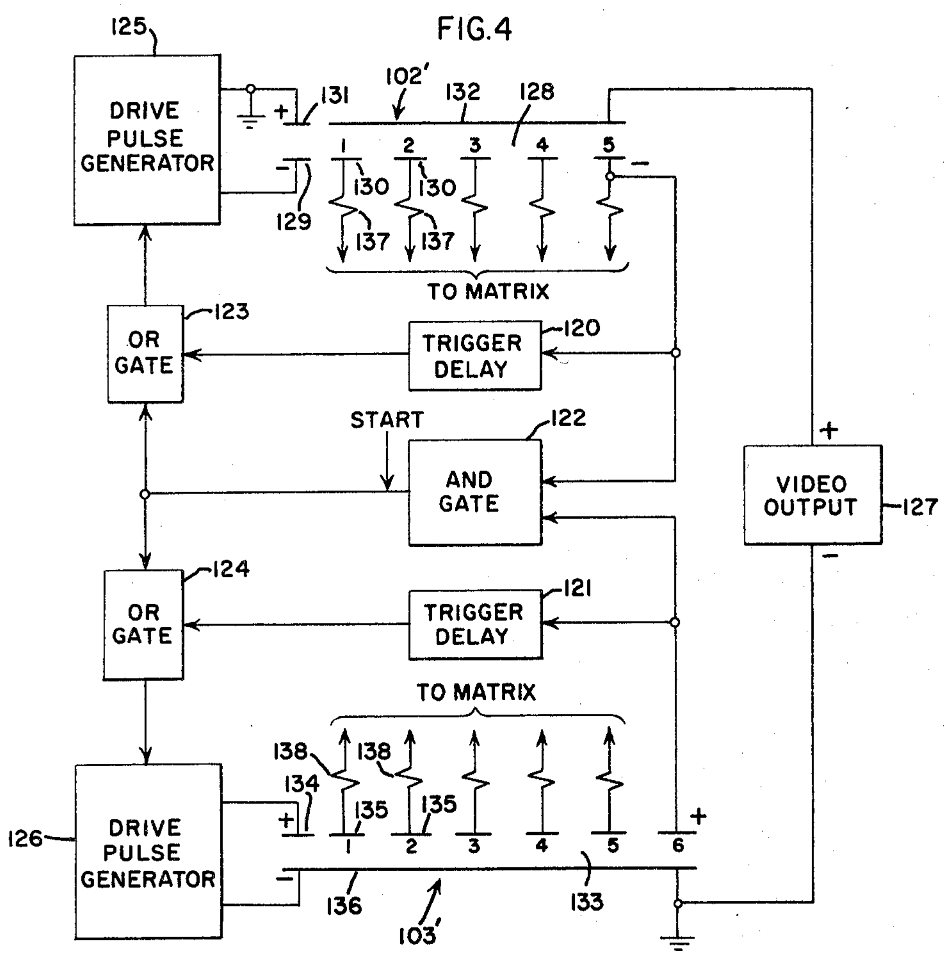
FIGURE 4 is a schematic circuit diagram of one exemplary form of delay line structure of the system of FIGURE 1 in combination with its synchronization, stabilization and readout circuitry.

The delay structures of FIGURE 1 can take a number of different forms. For example, they can be acoustic delay lines, distributed impedance delay lines, etc., as well as simplified microcircuit discrete component structures such as multi-output shift registers having the same shift frequency. In FIGURE 4 there is shown a schematic diagram of an acoustic delay line structure where delay lines 102′ and 103′ corresponding to delay lines A and B, respectively in FIGURE 1. The delay lines are connected in a synchronization and stabilization circuit including a pair of trigger delay networks 120 and 121, a pulse coincidence detector AND gate 122, a pair of OR gates 123 and 124 and two pulse generator networks 125 and 126, each, per se, a conventional component. Further, the delay lines are illustrated as employed in an image sensing application with a video output network 127 connected between the delay lines.

Delay line 102′ includes a piezoelectric crystal member 128, which may be, for example, barium titanate. On one surface of the crystal is an input electrode 129 and five output electrodes 130. On the opposite surface facing input electrode 129 is a grounded electrode 131, and facing the output electrodes 130 is a common floating electrode 132. Delay line 103′ is similar to line 102′. It includes a piezoelectric crystal 133, an input electrode 134 and six output electrodes 135 on one surface of the crystal and a single grounded electrode 136 on the opposing surface.

Pulse generator 125 is connected across electrodes 129 and 131 of delay line 102′. In response to applied pulse electromagnetic energy an acoustic wave is launched down the line, appearing at successive points in time as voltage pulses at output electrodes 130. Electrodes 130 are connected through attenuation compensation resistors 137 to the diagonal conductors of the matrix, shown in FIGURE 1. Resistors 137 have values assigned so as to apply equal voltages to each of the diagonal conductors. Similarly, pulse generator 126 is connected across electrodes 134 and 136 of delay line 103′ for launching an acoustic wave which appears at successive points in time as voltage pulses at output electrodes 135. Electrodes 135 are connected through attenuation compensation resistors 138 to the matrix column conductors, shown in FIGURE 1. The drive signals from generators 125 and 126 are applied to the input electrodes of delay lines 102′ and 103′ with opposite polarity so as to generate oppositely poled voltages at their respective output electrodes. Accordingly, current is caused to flow sequentially through the photosensitive components of the matrix as the matrix is scanned upon coincident voltage applications to addressed components. The video output network 127 includes conventional means for sensing and amplifying the current applied through the matrix components, network 127 being connected between floating electrode 132 and grounded electrode 136.

The fifth output electrode 130 of delay line 102′ is connected through trigger delay network 120 and OR gate 123 to the pulse generator 125 for triggering said generator, and in turn re-exciting the delay line. Correspondingly, the sixth output electrode 135 of delay line 103′ is connected through trigger delay network 121 and OR gate 124 for triggering pulse generator 126 and thereby re-exciting delay line 103′. Said fifth and sixth output electrodes of lines 102′ and 103′ are further connected to the input of pulse coincidence detector network 122 which in response to the coincident appearance of pulses at both output electrodes generates a pulse at the output thereof. Detector 122 is connected to second inputs of both OR gates 123 and 124 for providing a synchronous exhibition of relay lines 102′ and 103′.

In the operation of the circuitry of FIGURE 4, the delay lines initially may be synchronously excited by a start pulse applied at the output of gate 122 so as to cause the first five outputs of each delay line to step together and provide scanning of the first row of the matrix, as previously described. The voltage appearing at the fifth output electrode 130 of delay line 102′ is fed back through delay network 120 and pulse generator 125 with a delay provided by the components of the feedback path so as to launch a succeeding wave down the delay line. This generates a voltage at the first output electrode 130 one unit delayed from the voltage that appeared at the fifth output electrode. At this instant, corresponding to the beginning of the horizontal blanking interval, a voltage appears at the sixth output electrode 135 of line 103′ which is fed back through networks 121 and 126 so as to generate a voltage at the first output electrode 135 one unit delayed from the voltage that appeared at the sixth output electrode. Following, the outputs of delay lines 102′ and 103′ proceed to scan the second row, with the process successively repeated.

Because the delay lines and their feedback networks cannot be readily designed to provide precisely equal delays between output any slight difference in delay that may exist will be multiplied for every re-cycling of the delay lines. To avoid appreciable build-up of delay error, the delay lines are reset once each frame sequence by the action of the pulse coincidence detection network 122. From the table of FIGURE 3 it is seen that in time period 30, which is the period immediately preceding the line scan in which the outputs of the delay lines are in coincidence, the fifth output electrode 130 of line A and the sixth output electrode 135 of line B are energized together. Accordingly, by connecting these output electrodes to AND gate 122, a trigger pulse is provided thereby which is coupled through OR gates 123 and 124 for synchronously triggering pulse generators 125 and 126, and thereby synchronously exciting the input electrodes 129 and 134 so as to initiate a new scan sequence. As long as the delay error built up over a frame period is less than the width of the recirculating pulses, the system will be effectively stabilized by the described feedback connection through AND gate 122. However, it is preferable that the delay error per frame period be appreciably less than the recirculating pulse width in order to provide an effective coincident voltage application to the matrix components.

It is noted that voltage pulses are also fed back to pulse generators 125 and 126 from the fifth and sixth output electrodes 130 and 135 through trigger delay networks 120 and 121, which pulses will be slightly delayed with respect to the trigger pulse from AND gate 122. Retriggering the pulse generators in response to the pulses from networks 120 and 121 during this phase of the operation is avoided by constructing the generators to be energized only in response to the leading edge of an applied trigger pulse. Thus, the system is designed so that the trigger pulses from trigger delay networks 120 and 121 are delayed from but overlap the trigger pulses from AND gate 122.

Figure 5:
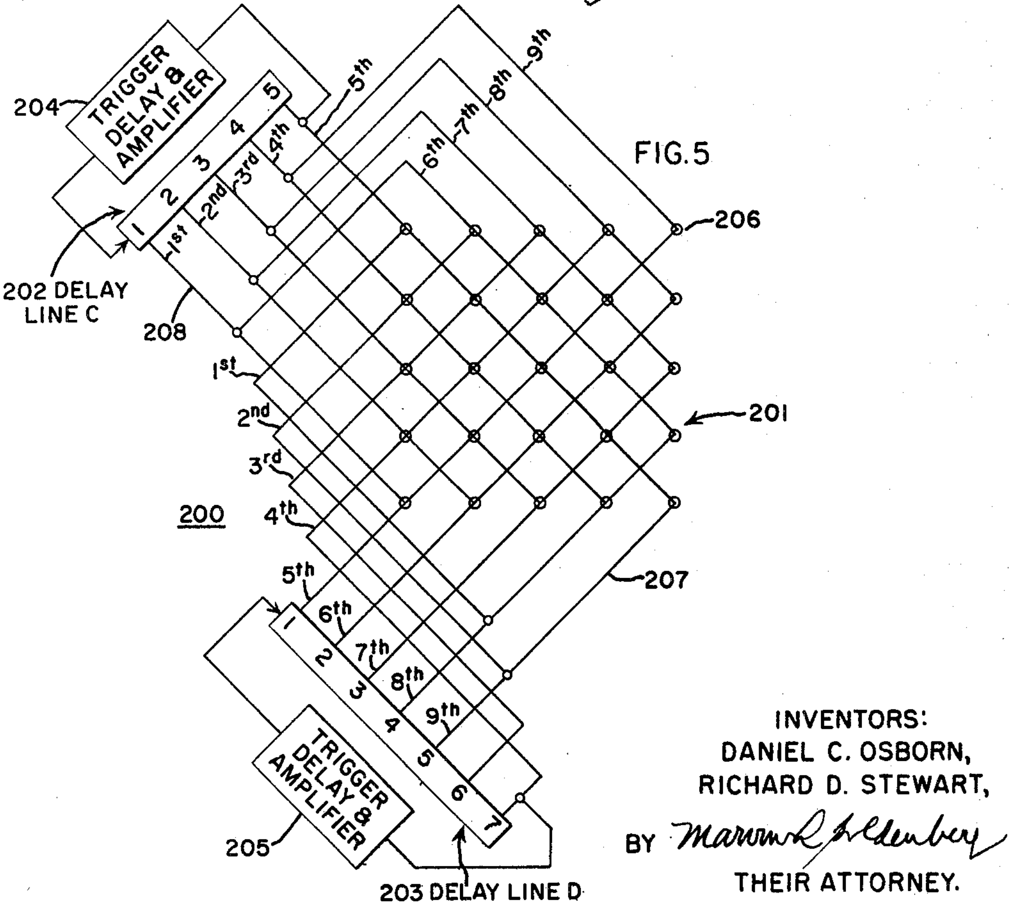
FIGURE 5 is a schematic diagram of a second embodiment in accordance with the invention of a delay line scanning system.

In FIGURE 5, there is schematically illustrated a second embodiment of a solid state delay line scanning system 200 for scanning a solid state matrix 201 which provides a line scan similar to that previously discussed with respect to the first embodiment of FIGURE 1. Thus, the system includes a first multitapped delay line 202, illustrated as delay line C, and a second multitapped delay line 203, illustrated as delay line D. As previously, energy is propagated along the delay lines so as to appear at the output taps thereof at successive points in time, delay lines C and D each having equally spaced output taps and providing substantially equal delays between adajcent taps. The end taps of delay lines C and D are fed back through trigger delay and amplifying networks 204 and 205, respectively, to successively re-trigger the lines in comparable fashion to that described with respect to FIGURES 1 and 4. A line scan of the matrix 201 is provided by employing delay line lengths differing by multiples of two unit lengths.

Figure 6:
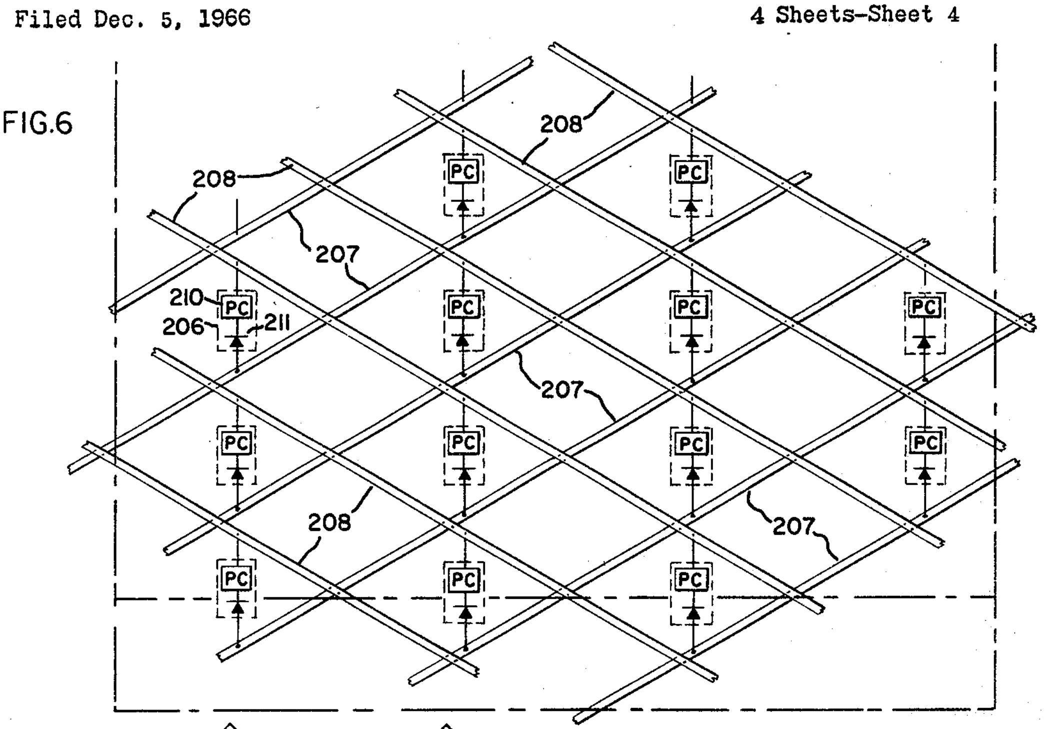
FIGURE 6 is a schematic perspective view of a portion of a photoconductor matrix such as may be employed in the system of FIGURE 5.

As before, the matrix 201 includes an array of matrix components 206 arranged in a column and row configuration of $m$ columns and $n$ rows. The components 206 are connected at one terminal thereof to a first set of diagonal conductors 207 connected to the output taps of delay line D, and at the other terminal thereof to a second set of diagonal conductors 208 connected to the output taps of delay line C. Conductors 207 and 208 intersect with the components 206 connected at alternate intersections thereof. A schematic perspective view of a portion of the matrix 201 is shown in FIGURE 6, illustrating an exemplary matrix construction in which the components 206 each include a photoconductor element 210 in series with a diode element 211.

For purpose of example, a 5 x 5 matrix is illustrated in FIGURE 5, although as with respect to the first described embodiment, rectangular matrices as well as other less regular matrix configurations may be employed. For a 5 x 5 matrix, delay line C may be identical to delay line A of FIGURE 1, its five output taps connecting to the nine diagonal conductors 208 as previously described with respect to delay line A. Delay line D is provided with seven output taps, the last tap being fed back to retrigger the line so as to result in a primary delay line length of seven units. Tap 1 of delay line D is connected to the fifth diagonal conductor 207, tap 2 is connected to the sixth conductor; tap 3 is connected to the seventh conductor; tap 4 is connected to the first and eighth conductors; tap 5 is connected to the second and ninth conductors; tap 6 is connected to the third conductor; and tap 7 is connected to the fourth conductor.

The operation of the system of FIGURE 5 will be explained with reference to the table of FIGURE 7. To initiate a frame scan, trigger pulses are simultaneously applied to the inputs of delay lines C and D, with coincident outputs occurring at the corresponding taps during the first five time periods so as to scan the first row of matrix components 206. At the end of the sixth time period output taps 1 and 6, respectively, of delay lines C and D are energized to provide a horizontal blanking interval. It is seen that said taps 1 and 6 are connected to the first and sixth diagonal conductors 208 and to the third diagonal conductor 207, which conductors intersect outside of and between rows of the matrix assembly 201 where no components 206 are located. During time periods seven through eleven, taps 2, 3, 4, 5, and 1 of delay line C are energized in synchronism with taps 7, 1, 2, 3, and 4 of delay line D, so as to scan the second row. In the twelfth time period output taps 2 and 5, respectively, of delay lines C and D are energized to provide a second horizontal blanking interval. From the table of FIGURE 7 it is seen that the last row is scanned during periods 25 through 29, which is followed by a single horizontal blanking interval in time period 30 and five vertical blanking intervals during the periods 31 through 35, after which the scanning of a second frame is initiated. The process thus repeats and successive frames are scanned in this manner.

In constructing a scanning system of the type exemplified in FIGURE 5, the following principles apply:

(1) The number of diagonal conductors connected to delay line C are equal to one less than the sum of the rows and columns of the matrix. The number of diagonal conductors connected to delay line D are also equal to one less than the sum of the matrix rows and columns.

(2) The lengths of delay lines C and D must differ by multiples of two unit lengths and must each be of odd number, so as to avoid addressing more than a single matrix component at one time. The shorter line must be at least equal to the number of columns.

(3) Delay lines C and D can have no more than two diagonal conductors connected to a single output tap, also to avoid double address of the matrix components.

(4) When scanning a rectangular or irregularly shaped matrix, the capacity for scan of delay lines C and D must be at least equal to that for scanning the smallest square matrix of odd number of columns and rows into which the scanned matrix can be fitted. For example, to scan a matrix of nine rows and twelve columns requires a delay line capacity for scanning a 13 x 13 matrix, or delay lines having lengths at least 13 and 15 units, respectively.

(5) The product of the total delay line output taps of lines C and D is equal to the number of matrix components scanned plus the horizontal and vertical blanking intervals, and therefore equal to the total number of time periods in a single frame scan.

When scanning successive rows of an odd matrix of square configuration, a single horizontal blanking interval per line is provided, with an equal number of vertical blanking intervals per frame, by making delay line D two units longer in length than line C. Further, the vertical direction of the scan proceeds from the lowermost line to the uppermost line. By inverting the delay line lengths and making appropriate connections between delay line taps and diagonal conductors, the vertical scan direction will reverse. An interlacing scan is provided by making the lengths of delay lines C and D differ by multiples of two greater than one, i.e., 4, 6, 8 etc., unit lengths difference, the horizontal and vertical blanking intervals also being increased in number. Additional horizontal and vertical blanking intervals can also be provided by further increasing the lengths of delay lines, but always maintaining odd lengths and a length differential of multiples of two.

As previously noted with respect to the embodiment of FIGURE 1, the delay line lengths referred to above are the primary delay line lengths, corresponding to the delays provided by the delay lines between recirculating pulses. Thus, although the primary delay line lengths are equal to the physical length of the lines in the embodiment of FIGURE 5, this is not a necessary condition so that the physical length of the delay lines may actually be longer than the required primary delay line lengths.

It is intended that the synchronization and stabilization circuitry of FIGURE 4 be applicable to the embodiment of FIGURE 5. The circuit connections and operation of the synchronization and stabilization circuitry when applied to FIGURE 5 will be the same as that illustrated in FIGURE 4, with the exception that the fifth output electrode of delay line C and the seventh output electrode of delay line D connect to the feedback networks.

The appended claims are intended to recite the invention in its broadest concepts and to include within their meaning all modifications and variations that fall within the invention's true scope. As an example of one such modification, the delay lines in each of the described embodiments may alternatively be driven by independently operating drive pulse generators of different stable operating frequencies in lieu of the re-cycling feedback connection that has been described. Although such alternative operation is not considered to be as desirable as the described embodiment because of added complexities in the components required, it nevertheless does fall within the basic teachings that have been presented.

What we claim as new and desire to secure by Letters Patent of the United States is:

1. A scanning system for scanning a matrix of solid state components connected between first and second sets of intersecting conductors, said system comprising:

(a) first means for successively generating a plurality of electrically isolated outputs at equally spaced time intervals, (b) second means for successively generating a second plurality of electrically isolated outputs at said equally spaced time intervals, (c) coupling means for coupling the outputs of said first means to said first set of conductors and the outputs of said second means to said second set of conductors, (d) drive means for applying drive signals to said first and second means for driving said first and second means at discretely different frequencies and therefore with a continuously varying phase relationship, thereby providing a sequential line scan of said matrix, and (e) a coincidence detector to which is coupled one output from each of said first and second means for generating a trigger signal once every frame period upon said one output occurring coincidentally, said trigger signal being applied to said drive means for bringing said drive signals into phase coincidence.

2. A scanning system as in claim 1 wherein said drive means includes a first feedback path for said first means and a second feedback path for said second means, said first feedback path coupling an output of said first means to the input thereof for re-cycling said first means and said second feedback path coupling an output of said second means to the input thereof for re-cycling said second means.

3. A scanning system for scanning a matrix of solid state components connected between first and second sets of intersecting conductors, said system comprising:

(a) first means for successively generating a plurality of electrically isolated outputs at equally spaced time intervals, (b) second means for successively generating a second plurality of electrically isolated outputs at said equally spaced time intervals, (c) coupling means for coupling the outputs of said first means to said first set of conductors and the outputs of said second means to said second set of conductors, (d) first drive means including a first feedback connection from an output of said first means to the input thereof for driving said first means at a first frequency, and (e) second drive means including a second feedback connection from an output of said second means to the input thereof for driving said second means at a second frequency discretely different than said first frequency so that said first and second means are driven with a continuously varying phase relationship reaching phase coincidence once every complete scan, whereby said first and second drive means provide a sequential line scan of said matrix.

4. A scanning system as in claim 3 wherein said matrix components are arranged in a column and row configuration with said first set of conductors extending along diagonals of said matrix and said second set of conductors extending along columns of said matrix, said matrix components being connected at adjacent intersections of said first and second sets of conductors and scanned along rows thereof, and wherein said first and second means are driven at frequencies the periods of which differ by at least one of said time intervals.

5. A scanning system as in claim 4 wherein said first means is a first delay line having multiple output taps and said second means is a second delay line having multiple output taps, which includes a coincidence detector and means for coupling one output tap from each of said first and second delay lines to said coincidence detector for generating a trigger signal once every frame period upon said one output taps being energized coincidently, said trigger signal being applied to said drive means for bringing said drive signals into phase coincidence.

6. A scanning system as in claim 5 wherein said drive means includes a first feedback path for said first delay line and a second feedback path for said second delay line, said first feedback path coupling an output tap of said first delay line to the input thereof for re-cycling said first delay line and said second feedback path coupling an output tap of said second delay line to the input thereof for re-cycling said second delay line.

7. A scanning system as in claim 6 wherein said feedback paths each include a delay network coupled to a pulse generator network.

8. A scanning system as in claim 3 wherein said matrix components are arranged in a column and row configuration, said first set of conductors extending along a first plurality of diagonals of said matrix and said second set of conductors extending along a second plurality of diagonals of said matrix which extend across said first plurality, said matrix components being connected at alternate intersections of said first and second set of conductors and scanned along rows thereof, and wherein said first and second means are driven at frequencies the periods of which are an odd number of said time intervals differing by an even multiple of said intervals.

9. A scanning system as in claim 8 wherein said first means is a first delay line having multiple output taps and said second means is a second delay line having multiple output taps, which includes a coincidence detector and means for coupling one output tap from each of said first and second delay lines to said coincidence detector for generating a trigger signal once every frame period upon said one output taps being energized coincidently, said trigger signal being applied to said drive means for bringing said drive signals into phase coincidence.

10. A scanning system as in claim 9 wherein said drive means includes a first feedback path for said first delay line and a second feedback path for said second delay line, said first feedback path coupling an output tap of said first delay line to the input thereof for re-cycling said first delay line and said second feedback path coupling an output tap of said second delay line to the input thereof for re-cycling said second delay line.

11. A scanning system as in claim 10 wherein said feedback paths each include a delay network coupled to a pulse generator network.

12. A scanning system as in claim 3 wherein said matrix components are arranged in a column and row configuration of *m* columns and *n* rows, the output supplying the feedback connection in said first means being spaced from its input by at least *m* time intervals and the output supplying the feedback connection in said second means being spaced from its input by at least one additional time interval than with respect to said first means.

13. A scanning system as in claim 12 wherein said first means has an electrical length equivalent to at least *m* time intervals and said second means has an electrical length equivalent to at least one additional time interval than with respect to said first means.

14. A scanning system as in claim 13 wherein the number of outputs of at least said first means are substantially less than the number of coupled conductors, with certain of the outputs being coupled to related pairs of conductors.

References Cited

UNITED STATES PATENTS

| | | |
|---|---|---|
| 2,830,179 | 4/1958 | Stenning. |
| 2,951,970 | 9/1960 | Matarese. |
| 3,263,225 | 7/1966 | Headle. |
| 3,300,581 | 1/1967 | Steinmeyer. |

ROBERT L. GRIFFIN, Primary Examiner

JOSEPH A. ORSINO, Jr., Assistant Examiner

U.S. Cl. X.R.

178—7.1, 7.3; 250—213; 313—108; 315—169; 340—166, 167